Feb. 24, 1970 T. GALLAGHER 3,497,813
MULTI-FREQUENCY RECEIVER WITH AUTOMATIC CHANNEL SELECTION AND PRIORITY CHANNEL MONITORING
Filed Aug. 21, 1967 2 Sheets-Sheet 1

Inventor
THOMAS GALLAGHER
BY
Mueller, Aichele & Rauner
ATTYS.

Feb. 24, 1970 T. GALLAGHER 3,497,813

MULTI-FREQUENCY RECEIVER WITH AUTOMATIC CHANNEL SELECTION AND PRIORITY CHANNEL MONITORING

Filed Aug. 21, 1967 2 Sheets-Sheet 2

Inventor
THOMAS GALLAGHER

BY Mueller, Aichele & Rauner

ATTYS.

United States Patent Office 3,497,813

Patented Feb. 24, 1970

3,497,813

MULTI-FREQUENCY RECEIVER WITH AUTOMATIC CHANNEL SELECTION AND PRIORITY CHANNEL MONITORING

Thomas Gallagher, Oak Park, Ill., assignor to Motorola, Inc., Franklin Park, Ill., a corporation of Illinois Filed Aug. 21, 1967, Ser. No. 661,977
Int. Cl. H04b *1/16*
U.S. Cl. 325—456 10 Claims

ABSTRACT OF THE DISCLOSURE

Multi-frequency receiver having a local oscillator with a plurality of channel elements selectively operative to control the received frequency, and a tone oscillator for modulating the local oscillator frequency. A search oscillator renders the channel elements operative in turn to monitor different frequency channels. A tone detector responds to the tone modulation when a carrier is present on the channel being received and disables the search oscillator. During reception, a priority channel is intermittently sampled and the receiver is locked on the priority channel in response to a carrier thereon.

BACKGROUND OF THE INVENTION

Multi-frequency receivers have been provided wherein a plurality of channel elements, such as crystals or tuned circuits, are selectively connected in the receiver circuit to provide operation on different frequencies. The channel elements may be selected by a manual selector switch or by some automatic control system. In some cases it is desired to accord a priority to one channel and to receive this channel at all times during which the signal is transmitted thereon. In the absence of the signal on the priority channel the receiver may operate on another channel or may operate on a plurality of other channels at different times. However, suitable systems have not been available for providing such priority operation in an automatic manner.

SUMMARY OF THE INVENTION

It is an object of the present invention to provide a receiver operative on channels of different frequencies which is rendered operative on a priority channel for a short interval in each sampling period and is held operative on such priority channel in response to the reception of a carrier thereon.

Another object of the invention is to provide a multi-frequency receiver having a local oscillator providing a plurality of different frequencies which are selected in turn to monitor channels of different frequencies, with tone modulation being applied to the local oscillator and detected when a carrier is present on the channel being received to hold the receiver on this channel, and wherein during reception a priority channel is intermittently sampled and the receiver is locked on the priority channel in response to reception of a carrier thereon.

In accordance with the invention a superheterodyne receiver includes a local oscillator having a plurality of channel elements for providing reception on channels of different frequencies. The local oscillator frequency is modulated by the oscillations from a tone generator, and a tone detector connected to the detector of the receiver is responsive to the tone. A switching circuit including a search oscillator, a ring counter and transistor selector switches render the channel elements operative in turn so that the receiver moves from one channel to another. When a carrier is received on a selected channel, the output of the tone detector acts to disable the search action so that the signal from the selected channel is received.

To accord priority to one channel, the channel element therefor is operated for a short time, such as twenty milliseconds, out of each sampling period which may have a duration of 500 milliseconds. When a carrier is present on the priority channel, the tone will be detected and acts to lock the priority channel so that signals therefrom are received. The channel switching circuit is disabled during priority reception, and at the end of the carrier on the priority channel, the channel which was being received when the receiver was switched to the priority channel is again rendered operative.

DETAILED DESCRIPTION

Figure 1:
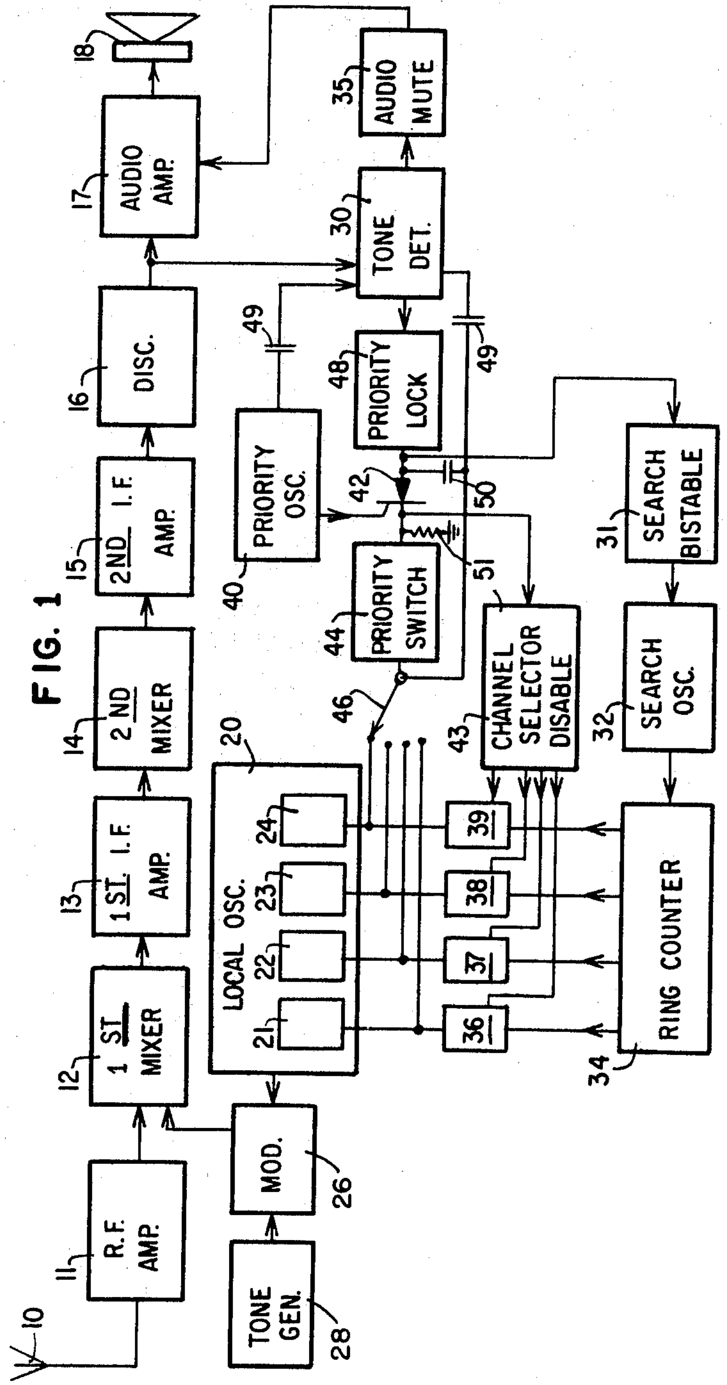
FIG. 1 is a block diagram of the multi-channel receiver of the invention.

Referring now to the drawings, FIG. 1 shows in block diagram a frequency modulation receiver including antenna 10, radio frequency amplifier 11, first mixer 12, first intermediate frequency amplifier 13, second mixer 14, second intermediate frequency amplifier 15, discriminator 16, audio amplifier 17 and loudspeaker 18. The second intermediate frequency amplifier 15 may include limiter stages. These sections of the receiver operate in a known manner.

The local oscillator 20 for the receiver is shown including four channel elements 21, 22, 23 and 24. A larger number of channel elements can be used but only four are shown for simplicity. Each of the channel elements includes a crystal and other components necessary to connect a particular crystal into the oscillator circuit, or may include other types of tuned elements such as condensers and inductors. The channel elements are selectively rendered operative in a manner to be described. The local oscillator signals are applied to modulator 26 to which tone oscillations are applied from tone generator 28. In the event that the receiver is used for receiving audio modulation frequencies up to 3,000 cycles, the tone oscillator may operate at a frequency of 3300 cycles, above the frequency range of the audio to be received. The modulated local oscillations are applied to the mixer 12, and when a carrier is present the tone modulation will appear at the output of discriminator 16 along with the modulation of the carrier. Tone detector 30, connected to the discriminator 16, must be tuned to select the particular tone frequency provided by the tone generator 28.

In order to cause the local oscillator to provide frequencies corresponding to a plurality of channels in turn, search oscillator 32 is provided. The oscillator 32 may produce pulses having a duration of 40 milliseconds with a space of 10 milliseconds between pulses. Pulses from the search oscillator are applied to ring counter 34 which has stages connected respectively through transistor selector switches 36, 37, 38 and 39 to the channel elements 21, 22, 23 and 24 of the local oscillator 20. Each switch will cause the channel elements to be operative for 40 milliseconds and then the ring counter will step to connect the next switch after a 10 millisecond interval.

Assuming that channel element 21 is rendered operative, the received carrier wave will be mixed with the oscillations controlled by channel element 21 to produce an intermediate frequency signal at the output of the mixer 12. When this signal is at the frequency of the first intermediate frequency amplifier 13, the tone modulation will be applied through the receiver to operate the tone detector 30. The tone detector will operate in response to a tone of 15 milliseconds duration, so that the operation of each channel element for 40 milliseconds provides more than enough time for tone detection. Tone detector 30 produces an output to actuate search bistable 31 which disables the search oscillator 32. The connection from the tone detector 30 to the search bistable 31 is through the priority lock circuit 48 to be later described. Accordingly, the scanning operation stops and the receiver will remain on the channel corresponding to channel element 21 as long as the carrier is received on this channel.

When the carrier on the channel which is selected terminates, the tone will no longer be applied to the tone detector 30 so that the search bistable 31 will operate to turn on the search oscillator 32. This will cause the ring counter to step so that the switch 37 renders channet element 22 operative. When no signal is present on the channel corresponding to element 22 to actuate tone detector 30 and search bistable 31 the search oscillator will continue and cause the ring counter to step again so that switch 38 renders channel element 23 operative. This operation will continue until a signal is received on one of the channels.

The tone detector 30 also applies a signal to audio mute switch 35 which cuts off the audio output when no carrier is present. The signal from the tone detector causes the audio mute switch to open to provide the audio output when a carrier is received.

Simultaneously with reception resulting from the searching operation, the sampling of a priority channel can be accomplished. This action is initiated by the priority oscillator 40 which produces a pulse of short duration, such as 20 milliseconds, out of a longer sampling period, such as 500 milliseconds. The pulse from the priority oscillator renders priority switch 44 operative through the gate cathode of silicon controlled rectifier 42. The priority switch 44 is connected through manual switch 46 to one of the channel elements 21, 22, 23 or 24. In the position shown, channel element 24 is connected through switch 46 to the priority switch 44 so that the pulse from priority oscillator 40 renders channel element 24 operative and the receiver responds to carrier waves having a frequency related to the element 24. The priority operation takes precedence over the search operation through action of the channel selector disable circuit 43. This disables the switches 36, 37, 38 and 39, with the ring counter 34 acting as a memory to retain the actuated condition of the switches.

When there is a signal on the priority channel, the tone modulation is detected by the tone detector 30 which applies a positive voltage through the priority lock stage 48 to the silicon controlled rectifier 42. The rectifier 42 thus becomes operative to lock the priority switch 44. Accordingly, the receiver will continue to operate on the priority channel as long as the carrier is received thereon. Priority switch 44 is connected to capacitor 49 which acts to discharge the tone detector 30 instantaneously so that when the priority channel is actuated the tone detector will be conditioned to respond to the tone modulation. This is necessary since the priority channel is rendered operative for only 20 milliseconds and a very fast response (15 milliseconds detector response) is desired to lock the same when there is a carrier present on the priority channel.

At the termination of the carrier on the priority channel, the priority lock 48 will release. The detector discharge sends a negative pulse to turn off silicon controlled rectifier 42 through capacitors 49 and 50, and the priority switch 44 will disconnect the priority channel. The channel selector disable will also release so that one of the switches 36, 37, 38 and 39 will connect the channel element which had been operative before the priority operation. The ring counter 34 acts as a memory to actuate the switch which had been actuated.

Figure 2:
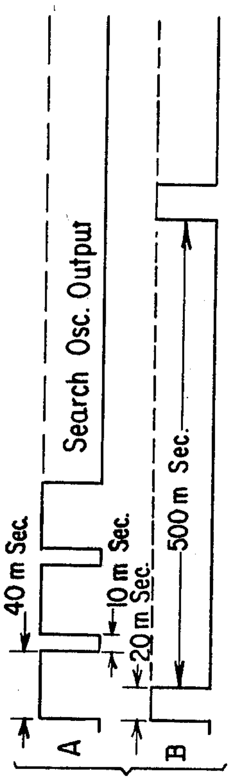
FIG. 2 is a chart of wave forms illustrating the scanning and priority sampling operation.

FIG. 2 illustrates the timing operation of the system. Line A shows the waveform of the pulses produced by the search oscillator 32. These may have a duration of 40 milliseconds with a space of 10 milliseconds between pulses. As the detector responds to a tone having a duration of 15 milliseconds, when a carrier is present the search oscillator will be disabled before the duration of the pulse so that the next channel will not be activated. Line B shows the operation of the priority oscillator. Each pulse has a duration of 20 milliseconds out of an interval of 500 milliseconds. The priority circuit acts to disable the search operation by action of the disable circuit 43. However, since the priority circuit only operates for 20 milliseconds out of every 500 milliseconds, this will not substantially interfere with the search operation. When a signal is being received, the action of the priority circuit will not interfere with communications since the 20 millisecond interruption will not disturb the intelligence significantly.

Figure 3:
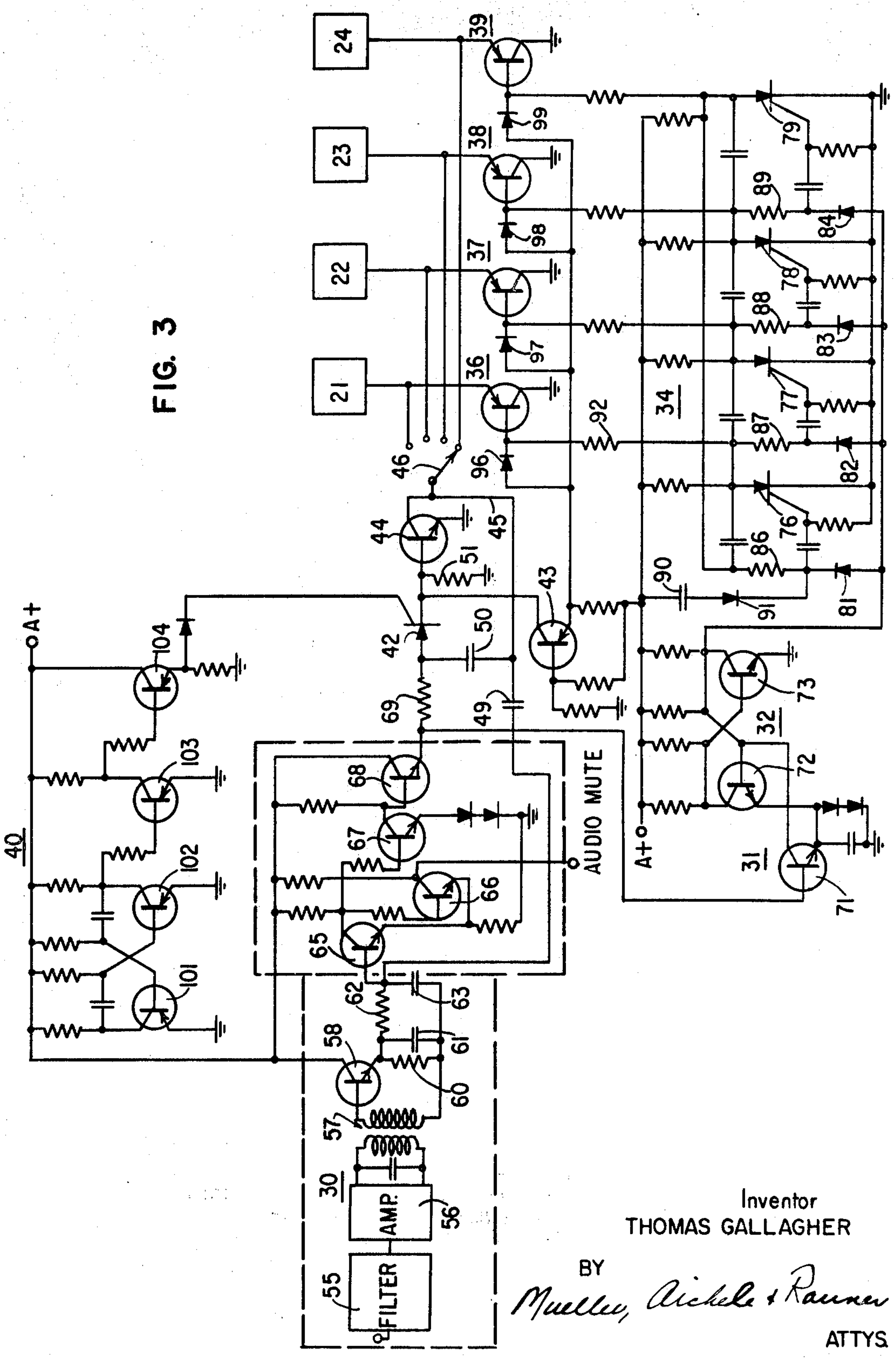
FIG. 3 is a complete circuit diagram of the scanning and priority system of the invention.

FIG. 3 shows the detailed circuit diagram of the tone detector and the components for searching from channel to channel and for according priority to a particular channel. The tone detector 30 includes a filter 55 for selecting a particular tone frequency. The selected signals are amplified in amplifier 56 and coupled through transformer 57 to transistor 58 which functions as the detector. The output signal is derived across the detector load circuit including resistor 60, capacitor 61, resistor 62 and capacitor 63.

The priority lock circuit includes transistors 65 and 66 connected in a Schmitt trigger circuit. The tone signal applied to the base of transistor 65 renders this transistor conducting so that the voltage applied from the collector thereof to the bases of transistors 66 and 67 drops. This will cut off transistors 66 and 67, so that the voltage at the collector of transistor 66 will rise to actuate the audio mute circuit. The voltage applied from the collector of transistor 67 to the base of transistor 68 will render transistor 68 conducting. This will apply the supply potential through resistor 69 to the anode of the silicon controlled rectifier 42. Transistor 67 acts as a buffer to prevent loading of the Schmitt trigger circuit, and transistor 68 provides the holding current required for the silicon controlled rectifier 42.

The potential at the emitter of transistor 68 is also applied to the base of transistor 71 of the bistable circuit 31. The collector of transistor 71 is connected to the base of transistor 72 which together with transistor 73 form the search oscillator 32. The oscillator 32 is a free running multivibrator but when the bistable circuit 31 is conducting, the base of transistor 72 is clamped to the emitter thereof to stop the oscillation.

The ring counter 34 includes 4 stages for use in the system described which has four channel elements. As previously stated a larger number of channel elements can be used and in such case the ring counter will have a corresponding number of stages. Each stage includes a silicon controlled rectifier with such rectifiers being identified 76, 77, 78 and 79. Pulses are applied from the collector of transistor 73 of the search oscillator through the diodes 81, 82, 83 and 84 to the gate electrodes of the silicon controlled rectifiers to render the same conducting. The diodes, however, are held off by voltages applied to the cathodes thereof through resistors 86, 87, 88 and 89, each of which is connected to the anode of the silicon controlled rectifier of the preceding stage. When the silicon controlled rectifier of any stage is conducting, the anode voltage drops so that the bias voltage applied to the diode of the next stage is removed, and the stepping pulse is applied to the gate of the silicon controlled rectifier of such next stage.

In order to start the ring counter, the supply voltage is applied through capacitor 90 and diode 91 to the gate electrode of the silicon controlled rectifier 76. When the system is turned on and A+ potential is applied, a pulse will be developed across capacitor 90 and applied through the diode 91 to the gate of rectifier 76. This will cause this rectifier to conduct initially each time the system is turned on so that the same counter stage is always operative first. Then the pulse from search oscillator 32 will be applied to diode 82 connected to the gate of silicon controlled rectifier 77 to cause the counter to step to the second stage. Since rectifier 76 will be initially conducting, the potential at its anode will drop so that the resistor 87 will not hold the diode 82 cut off. The action of the silicon controlled rectifier stages to conduct and cut off the preceding stage through the charge and discharge of the capacitors connected between the rectifier anodes is known.

The anode of each of the silicon controlled rectifiers of the counter 34 is connected to the base of one of the transistors of the switching circuits 36, 37, 38 and 39. Accordingly, when the silicon controlled rectifier of any counter stage is conducting, the voltage applied to the base of the switching transistor is reduced to render the same conducting. This will ground the channel element to render the same operative. More specifically, when rectifier 76 conducts as the system is turned on, the voltage at its anode is applied through resistor 92 to the base of transistor 36. This will render transistor 36 conducting to ground the channel element 21.

The priority oscillator 40 includes transistors 101 and 102 which form a free running multivibrator. Transistors 103 and 104 act as amplifiers to provide the required gate voltage for the silicon controlled rectifier 42. The priority oscillator 40 provides a 20 milliseconds pulse to the gate of the silicon controlled rectifier 42, derived each period of 500 milliseconds. If during the period of 20 milliseconds pulse the detector 30 responds, indicating a carrier wave is present on the priority channel, transistor 68 of the priority lock circuit 48 will conduct applying a positive potential to the anode of the silicon controlled rectifier 42. The two conditions, that is, gate pulse and positive anode voltage, are now present which will cause the silicon controlled rectifier 42 to "fire" or conduct. The gate pulse from the priority oscillator 40 will cease after 20 milliseconds but the rectifier 42 remains conducting supplying a voltage to the priority switch 44 so that the priority channel is locked on while detector 30 produces an output.

While the rectifier 42 is conducting, a voltage is developed across resistor 51 and applied to the base of transistor 44 which forms the priority switch to render the same conducting. This acts to ground the line 45 connected to the movable contact of switch 46. This movable contact can be set to apply ground to any one of the channel elements 21 to 24. In the position shown, the channel element 24 is selected, and the channel selected by element 24 is the priority channel.

The voltage across resistor 51 is also applied to the collector of transistor 43 which acts to disable the channel selector switches 36 to 39. Transistor 43 provides a potential through diodes 96, 97, 98 and 99 to transistors 36, 37, 38 and 39 to hold these transistors cut off so that they cannot render a channel element operative. This, however, does not change the setting of the ring counter so that when the disabling action is removed, the same transistor switch will again be rendered operative to connect the previously connected channel element.

The priority channel switch 44, when initially switched on by conduction of silicon controlled rectifier 42, applies a positive pulse through capacitor 49 to the capacitor 63 of the detector output to discharge the same so that the detector is prepared to respond immediately to a tone produced by a signal appearing on the priority channel. This action takes place because the connected channel element applies a positive potential through the switch 46 and line 45 to capacitor 49, as the line 45 is being grounded through the transistor 44. This makes it possible for the tone detector to respond during the 20 milliseconds gate pulse, as has been previously described.

The system of the invention therefore provides a receiver which will automatically scan a plurality of channels and remain tuned to a channel on which a carrier wave is received. The system has provisions for according priority to one channel so that this channel is intermittently sampled when the receiver is tuned to any other channel. The sampling of the priority channel is of very short duration, and does not interrupt reception of signals from the channel being received.

I claim:

1. A radio receiver of the superheterodyne type including in combination, local oscillator means having a plurality of channel elements for providing local oscillations of frequencies corresponding to different channels, actuating means coupled to said channel elements and including means for rendering said channel elements operative in turn, a mixer coupled to said local oscillator means for mixing received carrier waves with the local oscillations provided by the operative channel element, detector means coupled to said mixer for producing a control signal from the output thereof in response to the reception of a carrier wave on the channel corresponding to the operative channel element, means coupling said detector means to said actuating means for causing the same to hold an operative channel element in such operative condition in response to said control signal, sampling means for providing a sampling signal for a portion of each of successive sampling periods, selector means for connecting said sampling means to a selected one of said channel elements, said sampling means rendering said selected channel element operative during said portion of each sampling period, and means coupled to said sampling means for causing the same to hold the selected channel element operative in response to reception of a carrier wave on the channel associated with the selected channel element.

2. The radio receiver of claim 1 wherein said selector means includes a manual selector switch for making a connection to one of said channel elements.

3. A radio receiver of the superheterodyne type including in combination, local oscillator means having a plurality of channel elements for providing oscillations corresponding to different channels, a tone generator, modulator means connected to said oscillator means and to said tone generator for modulating the frequency of said local oscillations by the signal from said tone generator, a mixer coupled to said modulator means for mixing received signals with the modulated local oscillations, detector means coupled to said mixer for deriving tone signals from the output thereof, search oscillator means connected to said channel elements for rendering the same operative in turn, means coupling said detector means to said search oscillator means for disabling said search oscillator means in response to the tone signal, sampling oscillator means for providing a control signal for a portion of each sampling period, selector means connecting said sampling oscillator means to one of said channel elements and rendering a selected channel element operative during said portion of each sampling period, and locking means coupling said detector means to said selector means for locking said selector means and holding the selected channel element operative in response to a tone signal.

4. A radio receiver in accordance with claim 1 wherein said search oscillator means includes a ring counter and a plurality of solid state selector switches individually connected to said channel elements and rendered operative in turn by said ring counter.

5. A radio receiver in accordance with claim 4 including disabling means connecting said selector means to said solid state switches for disabling the same during said portion of each sampling period.

6. A radio receiver in accordance with claim 4 wherein said ring counter includes a plurality of silicon controlled rectifier stages rendered conducting in turn and said selector switches include transistors individually connected to said rectifier stages and controlled thereby, and including disabling means connected to said transistors and operating to render the same non-conducting, with the conducting rectifier stage of said ring counter acting to turn on said transistor connected thereto upon release of said disabling means.

7. A radio receiver in accordance with claim 1 wherein said selector means includes a manual selector for making connection to one of said channel elements and switch means rendered conductive by said control signal for actuating the connected channel element.

8. A radio receiver in accordance with claim 7 wherein said switch means includes a silicon controlled rectifier rendered conducting by said control signal, with said silicon controlled rectifier being connected to said locking means and held operative thereby during the presence of a tone signal.

9. A radio receiver in accordance with claim 1 which includes an audio circuit and an audio mute stage connected to said detector means and to said audio circuit for rendering said audio circuit operative in response to the tone signal and disabling said audio circuit in the absence of a tone signal.

10. A radio receiver in accordance with claim 1 wherein said detector means has an output circuit including a capacitor, and including means connected to said selector means for discharging said capacitor to render said detector means responsive to a tone signal.

References Cited

UNITED STATES PATENTS

| | | | |
|---|---|---|---|
| 2,977,467 | 3/1961 | Black | 325—456 XR |
| 3,007,044 | 10/1961 | Cookson | 325—453 XR |
| 3,388,215 | 6/1968 | Mayle | 325—464 XR |

ROBERT L. GRIFFIN, Primary Examiner

C. R. VON HELLENS, Assistant Examiner

U.S. Cl. X.R.

325—424, 453; 343—205